United States Patent [19]

Shirasaki

[11] Patent Number: 5,701,376
[45] Date of Patent: Dec. 23, 1997

[54] POLARIZED-WAVE-DISPERSION-PREVENTIVE OPTICAL FIBER AND ITS MANUFACTURING METHOD

[75] Inventor: Masataka Shirasaki, Kanagawa, Japan

[73] Assignee: Fujitsu Limited, Kanagawa, Japan

[21] Appl. No.: 655,315

[22] Filed: May 24, 1996

[30] Foreign Application Priority Data

Jul. 26, 1995 [JP] Japan .................................. 7-190536

[51] Int. Cl.⁶ .............................. G02B 6/02; G02B 6/16
[52] U.S. Cl. ........................... 385/123; 385/121; 65/432
[58] Field of Search ................................ 385/123–128, 385/11, 12; 65/432

[56] References Cited

U.S. PATENT DOCUMENTS 4,962,994  10/1990  Someda ............................. 385/123 X Primary Examiner—Phan T. H. Palmer
Attorney, Agent, or Firm—Helfgott & Karas, P.C.

[57] ABSTRACT

An optical fiber comprises a core line, which includes a core and a cladding, and a cover. The core line is twisted 90° clockwise and counterclockwise alternately at predetermined intervals (for example, every 30 meters). The twisted portion in the core line is equal to or shorter than 1 m, and is more preferably only several centimeters long. Since the optical fiber has residual birefringence, there exist two principal axes of birefringence, that is, a fast axis f and a slow axis s in the core line. Since the core line is 90° twisted at the twisted portion, the two principal axes of the consequent portion exchange their direction compared with the two principal axes of the antecedent portion. Thus, twisting the core line effectively shortens the sustaining distance of the birefringence of the optical fiber, and exchanging the directions of the two principal axes successfully suppresses the polarized wave dispersion.

20 Claims, 8 Drawing Sheets ns to an optical fiber used in an optical transmission line, and more specifically to an optical fiber for preventing and effectively reducing the dispersion of the polarized wave that accompanies residual birefringence, and also to a method of manufacturing such optical fiber.

POLARIZED-WAVE-DISPERSION-PREVENTIVE OPTICAL FIBER AND ITS MANUFACTURING METHOD

BACKGROUND OF THE INVENTION

1. Field of the Invention

The present invention relates to an optical fiber used in an optical transmission line, and more specifically to an optical fiber for preventing and effectively reducing the dispersion of the polarized wave that accompanies residual birefringence, and also to a method of manufacturing such optical fiber.

2. Description of the Related Art

The research and development of optical communications using optical fibers have been widely made. In the optical communications, optical fibers for long-distance communications are indispensable for connection between a transmitter and a distant receiver.

It is desired, in the optical communications, that a large volume of information is transmitted at a higher speed than in the conventional electrical communications, thereby requiring an improvement in the optical signal transmission characteristics of the optical fibers.

Normally, an optical fiber comprises a core, a cladding, and a protective cover. The core transmits an optical signal while the cladding protects the core and encloses the optical signal within the core. That is, the cladding is made of a material having a lower refractive index so that the optical signal in the core can propagate as it totally reflects at the boundary between the core and cladding.

The fibers comprising cores and claddings covered with nylon protective covers, etc. form an optical fiber cable.

Normally, in the design of an optical fiber, the core has a true-circular cross-section. The core having the true-circular cross-section produces isotropic distribution of refractive index and stress to suppress birefringence.

However, in the actual manufacture of the optical fibers, the core may not have a true-circular cross-section, and stress in the optical fibers may remain even after the manufacturing process, thereby generating a small amount of birefringence referred to as residual birefringence.

The residual refringence is estimated at about $10^{-7}$, and the birefringence can remain for a length of 1 through 5 km in the optical fibers. That is, the factor generating the birefringence is considered to be applied at random during manufacture to the optical fibers, equally over a certain length of time. During that time, the optical fibers are manufactured for a length corresponding to the length of time. Then, the factor is applied in a different way which continues for the certain length of time. Thus, an unknown factor applied at random for a certain length of time to the optical fiber during manufacturing generates the birefringence for the length corresponding to the time for which the factor is applied. Therefore, it is considered that the factor generating the birefringence changes for certain lengths of the optical fiber.

FIGS. 1A and 1B are cross-sectional views of the optical fibers generating the birefringence. Of the various factors generating the birefringence, the shape of the core is explained below in detail.

As shown in FIGS. 1A and 1B, the optical fiber comprises a core 63 and a cladding 64. The protective cover over the cladding 64 is omitted here.

If the cross section of the core is a true circle as shown in FIG. 1A, then the core 63 is isotropic for the light signal propagating in the core 63. Therefore, two states of polarization (first polarization 69 and second polarization 70), which are normal to each other, are not distinguishable from each other. The optical signals indicate the respective polarization states and propagate at the same speed in the optical fibers. Therefore, no birefringence is detected.

On the other hand, if the cross section of the core is an oval shape as shown in FIG. 1B, the core 66 is not isotropic for the light signal propagating through the core 66, and the light signal in the first polarization 69 and the light signal in the second polarization 70 propagate through the core 66 under different conditions, that is, at different speeds. Namely, the birefringence occurs about the polarization directions of the first polarization 69 and the second polarization 70 as the two principal axes.

For example, if the polarization of the light signal input to the optical fiber is that shown as 68 in FIG. 1B, then the input light signal enters the core 66, and propagates through the core 66 after being divided into the light signal of the first polarization 69 and the light signal of the second polarization 70.

However, since the first polarization 69 and second polarization 70 are different from each other in transmission speed, the light signal that is input in a pulse state is divided into two light signal pulses different from each other in arrival time when output from the optical fiber. This is referred to as the dispersion of polarized waves.

FIGS. 2A through C show how the light signal is output when the light signal pulses are input to the optical fiber having the birefringence as shown in FIG. 1B. In the three graphs (shown in FIGS. 2A through C), the vertical axes indicate the intensity of light while the horizontal axes indicate time.

FIG. 2A shows an input optical signal of a pulse width $W_1$. If the optical signal is input to the optical fiber having the residual birefringence as shown in FIG. 1B, then the optical signal is divided into the light signal of the first polarization 69 and the light signal of the second polarization 70, and the two light signals propagate at different speeds. Therefore, the light signals are different from each other in arrival time as shown in FIG. 2B. When such light signals are received on the receiving side, they are detected as an optical signal having an extended pulse width $W_2$. Thus, the optical signal having a small input pulse width $W_1$, when transmitted through the optical fiber having the residual birefringence, is changed into an optical signal having a larger pulse width $W_2$ as shown in FIG. 2C.

For example, when a light signal propagates through the optical fiber having a birefringence of $10^{-7}$ and a sustaining distance of 3 km, the difference in arrival time between the polarized waves generated by propagation of the light over the distance (3 km), is approximately 1 ps.

Assuming that two principal axes of birefringence are independent (vary at random) for each sustaining distance of birefringence when the light propagates for L km through the optical fibers, a statistical study finds out that the total dispersion of the optical fiber is √(L/3) ps. since the total dispersion is proportional to the square root of the distance through which the light propagates, the coefficient indicating the dispersion of the polarized wave of the optical fiber is normally calculated by dividing the total dispersion by the square root of the distance. That is, the optical fiber features the dispersion of 0.58 ps/√km.

Assuming that the total length of the optical fiber is 1,000 km, the total dispersion of the signal through the optical fiber is represented as 18.3 ps. Therefore, the signal width is 100 ps per bit when, for example, a 10 Gb/s signal is transmitted, and the dispersion is equal to 20% of the transmitted signal. As a result, the received signal may not be correctly read.

Thus, the polarized wave dispersion may cause undesirable influences, but no effective solutions have been developed so far.

SUMMARY OF THE INVENTION

The present invention aims at effectively reducing the polarized wave dispersion of optical fibers to prevent a signal from being deteriorated by the polarized wave dispersion of light generated by the residual birefringence of the optical fibers when the light signal is transmitted through the optical fibers. The present invention also aims at providing an effective method of manufacturing optical fibers.

The optical fiber according to the present invention comprises a core line for propagating a light signal and its cover. The core line is twisted within a predetermined range at predetermined intervals.

In the method of manufacturing the optical fibers according to the present invention, the basic material comprising a core and cladding is heated. The heated basic material is drawn out to form a core line and twisted within a predetermined range at predetermined intervals. Then, a cover is formed over the core line.

Twisting the core line shortens the actual sustaining distance of the birefringence of optical fiber, thereby suppressing the polarized wave dispersion and compensating for the residual dispersion. That is, since the polarized wave dispersion is proportional to the square root of the product of the fiber length by the birefringence sustaining distance, when an optical fiber for long distance communications is formed length of the optical fiber becomes long, thereby producing a large polarized wave dispersion. However, twisting the optical fiber at intervals shorter than the birefringence sustaining distance shortens the actual birefringence sustaining distance. Thus, the polarized wave dispersion can be successfully suppressed. Furthermore, if the twisting degree is 90° clockwise and counterclockwise and the twisting is made alternately clockwise and counterclockwise, then the principal axis of the birefringence can be exchanged before and after the twisted portion, thereby further suppressing the polarized wave dispersion.

Since there is only one step in twisting the core line of the optical fiber, the manufacturing process can be very simple and provides an effective optical fiber when optical fibers for long-distance communications are manufactured.

DESCRIPTION OF THE PREFERRED EMBODIMENTS

Figure 1A:
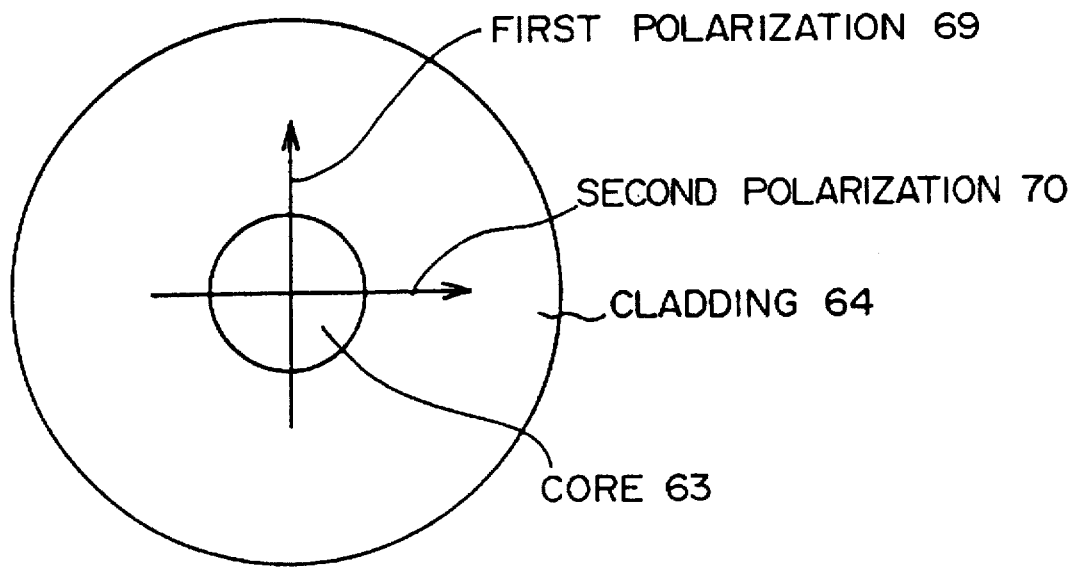
FIGS. 1A through 2C are diagrams for explaining the polarized wave dispersion.
Figure 1B:
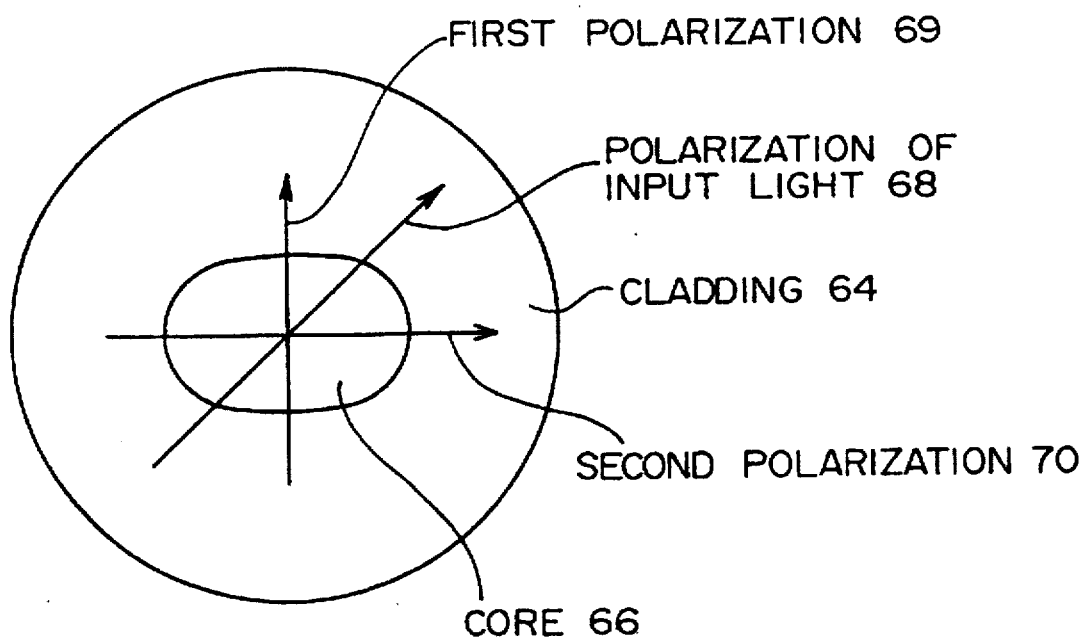
Figure 2A:
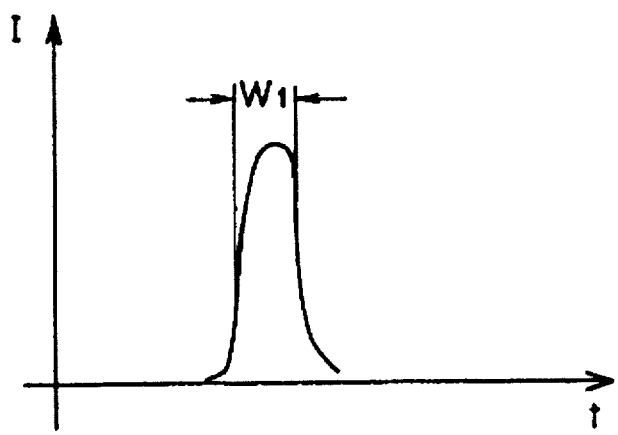
Figure 2B:
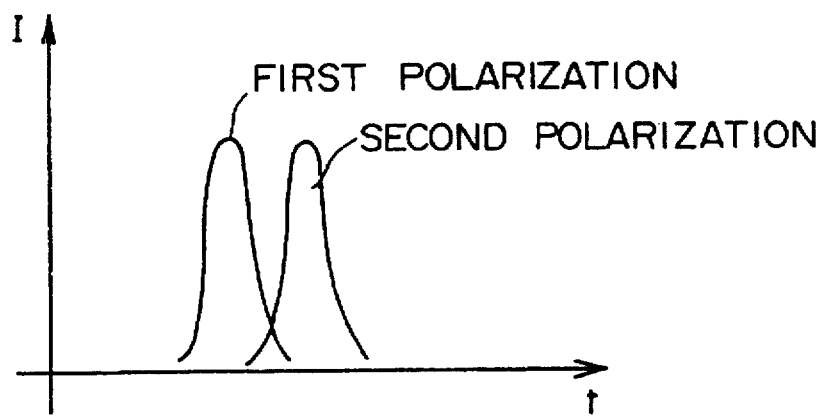
Figure 2C:
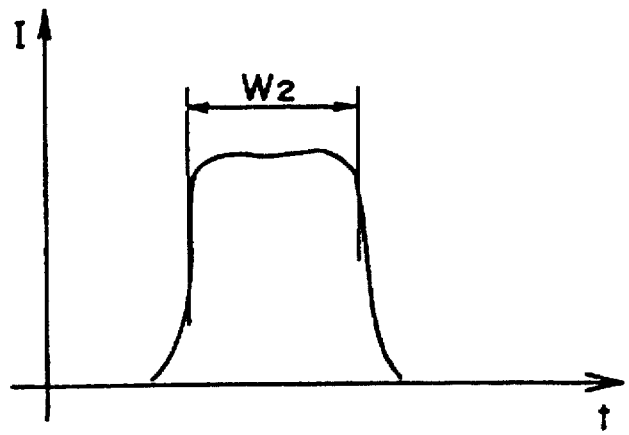
Figure 3A:
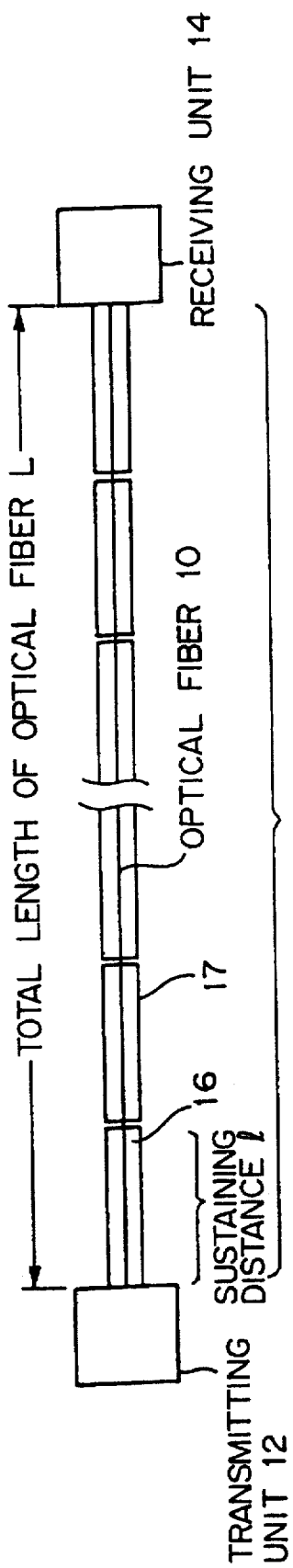
FIGS. 3A and 3B show the principle of the present invention.
Figure 3B:
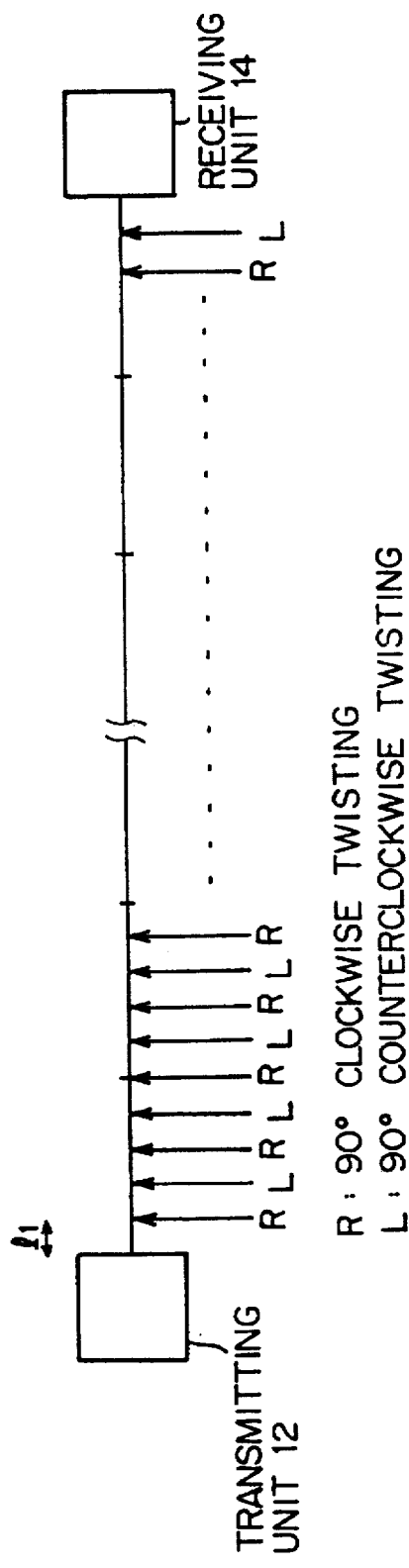

FIGS. 3A and 3B show the principle of the present invention.

FIG. 3A shows the outline of an optical communications system. In FIG. 3A, an optical fiber 10 connects a transmitting unit 12 to a receiving unit 14. Normally, in an optical communications system, a relay unit, etc. is provided in the optical fiber 10, but is not shown in FIG. 3A because it is not required for explaining the principle of the present invention. All other devices attached to the optical fiber 10 are also omitted in FIG. 3A for clarity.

As described above, the optical fiber 10 features residual birefringence. The state of the birefringence, for example, the direction of the two principal axes of birefringence, changes for each sustaining distance, as illustrated in FIG. 3A. The birefringence of the optical fiber 10 has an equal sustaining distance l, and the entire optical fiber 10 can be divided into portions having a length of l. The entire optical fiber 10 is divided into a plurality of such portions, and each portion has the length of l. The total length of the optical fiber 10 is L and is divided into n portions.

Regarding a portion 16 in the divided optical fiber 10, the two principal axes of birefringence are constant, and therefore the optical signal receives the same dispersion while it passes through the portion 16. Therefore, the optical signal output as a pulse from the transmitting unit 12 receives the polarized wave dispersion proportional to the sustaining distance l when it passes through the portion 16.

This holds true with any portion of the divided optical fiber 10.

If the directions of the two principal axes of birefringence in each portion of the divided optical fiber 10 are independent of each other and change at random, then the polarized wave dispersion of the light signal propagating through the entire length L of the optical fiber 10 is considered to be proportional to the value $\sqrt{n}$, known as the fluctuation dispersion.

Assuming that, as described above, the polarized wave dispersion of the optical signal output from the transmitting unit 12 and input to the receiving unit 14 through the entire optical fiber 10 is t, the equation is expressed as follows.

$$t \propto l\sqrt{n}$$

where n=L/l

Thus, equation (1) is expressed as follows.

$$t \propto \sqrt{(lL)} \qquad (1)$$

According to equation (1), increasing the total length of the optical fiber 10 generates larger polarized wave dispersion, while decreasing the birefringence sustaining distance suppresses the polarized wave dispersion.

If the two principal axes of birefringence in the portions 16 and 17 of the divided optical fiber 10 can be exchanged with each other, then the polarized wave dispersion in the portion 16 can be suppressed by the polarized wave dispersion in the portion 17, thereby further reducing the polarized wave dispersion of the entire optical fiber 10.

According to the present invention, at least the core line is twisted within a predetermined range at predetermined intervals. For a more desirable configuration, the optical fiber comprising a core and cladding is twisted 90° clockwise and counterclockwise for each length $l_1$ shorter than the birefringence sustaining distance l in the manufacturing process of the optical fiber 10 as shown in FIG. 3B. The twisted optical fiber is then covered. R and L shown in FIG. 3B indicate that the optical fiber is twisted at the position of each arrow clockwise and counterclockwise respectively. 90° twisting of the optical fiber indicates that a twisted portion and each of its adjacent portions make a 90°-twist. Twisting clockwise and counterclockwise indicates that the optical fiber is twisted clockwise and counterclockwise when the optical fiber is viewed form the direction of the central axis of the optical fiber.

As shown in FIG. 3B, twisting the optical fiber effectively sets the polarized wave sustaining distance to $l_1$. Accordingly, equation (1) is expressed as t∝√($l_1$L), where l>$l_1$. As a result, the polarized wave dispersion can be suppressed. The result from equation (1) indicates that the polarized wave dispersion can be suppressed by, not only twisting the optical fiber 90° clockwise and counterclockwise, but by shortening the birefringence sustaining distance, in most cases. According to the present invention, the birefringence sustaining distance can be shortened only by twisting the optical fiber, and the twisted optical fiber can be manufactured more easily than other types of optical fibers having the same level of polarized wave dispersion suppressing effect. The manufacturing method according to the present invention is particularly effective in producing the optical fiber for long-distance communications.

Since the fiber is twisted 90° clockwise and counterclockwise, the two principal axes of birefringence of the optical fiber before a twisted portion and the two principal axes of birefringence of the optical fiber after the twisted portion replace each other, and therefore offset the polarized wave dispersion of each other. As a result, the polarized wave dispersion suppressing effect can be improved more effectively. The effect can be obtained by 90° twisting of the optical fiber. The twisting degree does not have to be exactly 90°, as other twisting degrees also produce acceptable effects.

That is, the polarized wave dispersion suppressing effect can be obtained only by shortening the birefringence sustaining distance as represented by equation (1). Therefore, approximate 90° twisting degrees are included in the scope of the present invention.

Furthermore, only uni-directional transmission is described. But, bi-directional transmission can be performed using same optical fiber. Note that a bi-directional transmission is considered as well as an uni-directional transmission when only an uni-directional transmission is explained through the specification of the present invention.

Figure 4:
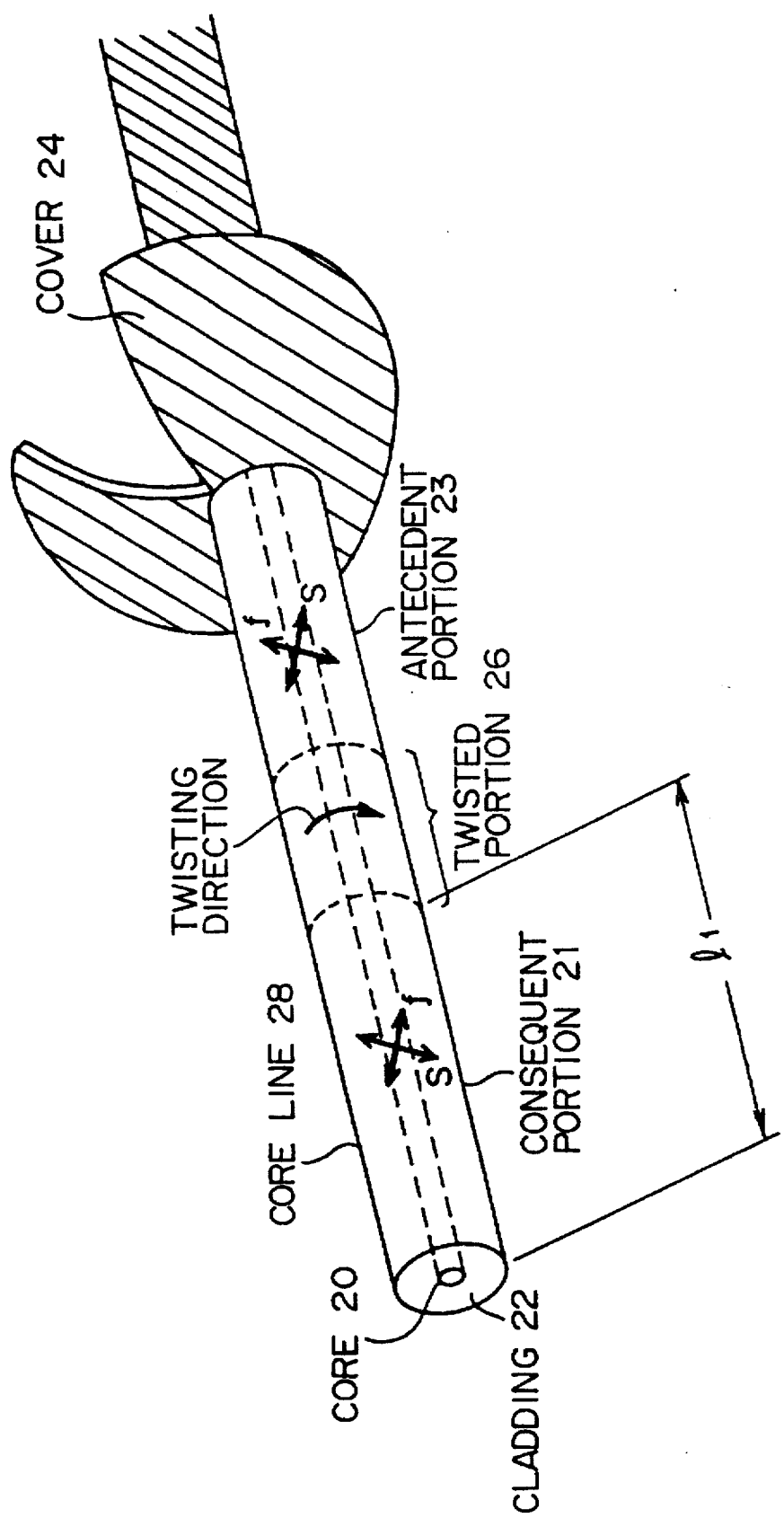
FIG. 4 shows an embodiment of the optical fiber according to the present invention.

FIG. 4 shows an embodiment of the polarized wave dispersion suppressive optical fiber according to the present invention.

The optical fiber shown in FIG. 4 comprises a core line 28 including a core 20 and a cladding 22 covering the core 20, and a cover 24. In FIG. 4, the core line 28 is exposed with a part of the cover 24 cut back to clearly show the structure of the core line 28. In practice, the core line 28 is actually covered with the cover 24.

When the core line 28 is covered with the cover 24, the core line is twisted 90° at predetermined intervals, for example, for each length of 30 m. The twisting degree does not have to be exactly 90°, but can be practically in the range of 45° through 135°. The predetermined length corresponds to $l_1$ shown in FIG. 3B, and should be set to an appropriate value in the range of 10 through 50 m. Thus, the core line 28 has the twisted portion 26, and includes stress from the twisting process.

A twisted portion 26 generated by 90° twisting of the optical fiber should be equal to or shorter than 1 m, and more preferably several millimeters through several tens of centimeters. That is, the optical fiber is twisted relatively quickly. After the twisting process, the twisted portion 26 is then provided with the cover 24. Providing the cover 24 in such a way that the stress on the optical fiber generated by twisting or rotating can be maintained, produces an optical fiber similar in appearance and handling to common optical fibers.

Since the twisted portion 26 contains the dynamic stress, it may need to be protected so that further external stress does not hurt the optical fiber. For example, the cover 24 of the twisted portion 26 can be thicker than that of other portions, or the material of the cover 24 can be hardened in a hardening process, etc. Also, only the cover 24 over the twisted portion 26 can be replaced with another material.

If the optical fiber is twisted quickly in the above described range, then no change arises in polarization state, and the two principal axes of birefringence of the optical fiber are exchanged with each other.

There are two types of principal axis of birefringence. The first one is a fast axis f through which light propagates relatively fast and another one is a slow axis s through which light propagates relatively slowly. In a consequent portion 21, the fast axis f is horizontal while the slow axis s is vertical. However, if the core line 28 is 90° twisted at the twisted portion 26 in the direction of the arrow, then the principal axes of birefringence in an antecedent portion 23 are the fast axis f in the vertical direction and the slow axis s in the horizontal direction. Therefore, the light signal polarized along the fast axis f in the consequent portion 21 passes in parallel with the slow axis s after passing the twisted portion 26. Likewise, the light signal polarized along the slow axis s in the consequent portion 21 passes in parallel with the fast axis f after passing the twisted portion 26. Thus, the light signal propagating quickly in the consequent portion 21 propagates slowly in the antecedent portion 23 while the light signal propagating slowly in the consequent portion 21 propagates fast in the antecedent portion 23, thereby offsetting the differences in propagation speed between the two polarized light signals, and suppressing the polarized wave dispersion.

When the optical fiber is optimally twisted, the stress generated by the twisting is isotropic to the central axis of the optical fiber and has no influence on the polarization. Normally, the state of the polarized wave of a light signal changes with the changes of the stress and distortion of the core line 28, if they occur in moderation.

Therefore, if the twisted portion 26 is long, the polarization changes correspondingly. That is, the light signal polarized along the fast axis f in the consequent portion 21 changes polarization at the twisted portion 26 and propagates as a polarized light signal parallel with the fast axis f in the antecedent portion 23.

Therefore, the twisted portion 26 should be short enough to maintain the same polarization of the light signal. That is, since the beat length of normal optical fibers is 1 through several meters long, the twisted portion 26 should be shorter than the beat length. Therefore, the twisted portion 26 should be equal to or shorter than 1 m, and more preferably several millimeters through several tens of centimeters.

Thus, sufficiently shortening the twisted portion 26 allows the two principal axes of birefringence of optical fiber in which the light signal is propagating through the core 20 to be exchanged quickly. Therefore, the polarization of the light signals cannot keep up with the exchange of the principal axes, thereby maintaining the polarization of the light signals in the antecedent portion 23 the same as that in the consequent portion 21, and changing only the principal axes of birefringence of the optical fiber.

The length of the beat refers to the cycle of the polarization change in the length direction of the optical fiber. That is, the light signal propagating in the optical fiber propagates as the polarized light signals along two principal axes, and the light signal is actually composed of two polarized light signals. The polarized light signal along the fast axis f is fast in phase while the polarized light signal along the slow axis s is slow in phase. Therefore, the combined polarized light signals change from straight polarized light signals to circular polarized light signals and from circular polarized light signals to straight polarized light signals in the consequent portion 21. For example, the propagation distance of the light signals from one straight polarized light signals to the next straight polarized light signals is referred to as the length of the beat.

Actual optical fibers cannot always be acceptable even if the length of the twisted portion 26 is equal to or shorter than 1 m. That is, too short a twisted portion 26 may damage the optical fibers and therefore the twisted portion 26 should be long enough not to damage the optical fibers.

When the twisted portion 26 is set appropriately long, the optical fiber should be even in quality having a relatively long beat length. If an optical fiber of uneven quality is used, then the beat length is short and the twisted portion 26 should be made shorter.

The comparison between the twisted optical fiber according to the present invention and a non-twisted optical fiber is made using equation (1).

If the sustaining distance of the birefringence of the non-twisted optical fiber is 3 km, and the fiber is twisted every 30 meters, then it is considered that the sustaining distance of the birefringence of the optical fiber is actually 30 m. Using equation (1), the value of the dispersion equals 0.06 ps/√km, that is, 1/10 of that for the non-twisted optical fiber, and the influence of the dispersion can be ignored in long-distance communications. The value is calculated on condition that the directions of the principal axes of birefringence are independent of each other in every 30 meter portion. Accordingly, the present embodiment has the polarized wave dispersion suppressing effect only by twisting the optical fiber by an optional degree without twisting the optical fiber by exactly 90° clockwise or counterclockwise.

Additionally, according to the present embodiment, twisting the optical fiber 90° clockwise and counterclockwise actually exchanges the principal axes of birefringence and consequently offsets the birefringence and further reduces the dispersion.

However, since actual optical fibers exhibit over-twisting or untwisting of the core line 28 even if the core line 28 is 90° twisted and then fixed by providing it with a cover, and the principal axes of birefringence are not completely exchanged. Therefore, considering the over-twisting and untwisting, it is desired that the twisting degree of the core line 28 should finally be exactly 90°. It is obvious that the present invention includes the optical fiber twisted by degrees other than 90° because an effect close to that from the 90°-twisting can be obtained.

To manufacture the optical fiber designed as shown in FIG. 4, a cover forming device is used when a cover is provided for the core line, and a core line supporting device is rotated to +θ and −θ alternately within a predetermined twisting range. The optical fiber is twisted between a core line support unit and a cable support unit located at distance d after the support unit. The core line of the covered fiber is twisted at a twisting rate of θ/d in the length direction. Therefore, the total twisting is calculated by multiplying the twisting rate by the twisting range (length). The value θ is determined from the twisting range (length) in such a way that the product should be 90°. Actually, the rotation degree θ is determined depending on the rotation maintaining strength of the cover so that the core line indicates a 90° rotation after providing the cover onto the core line.

Figure 5A:
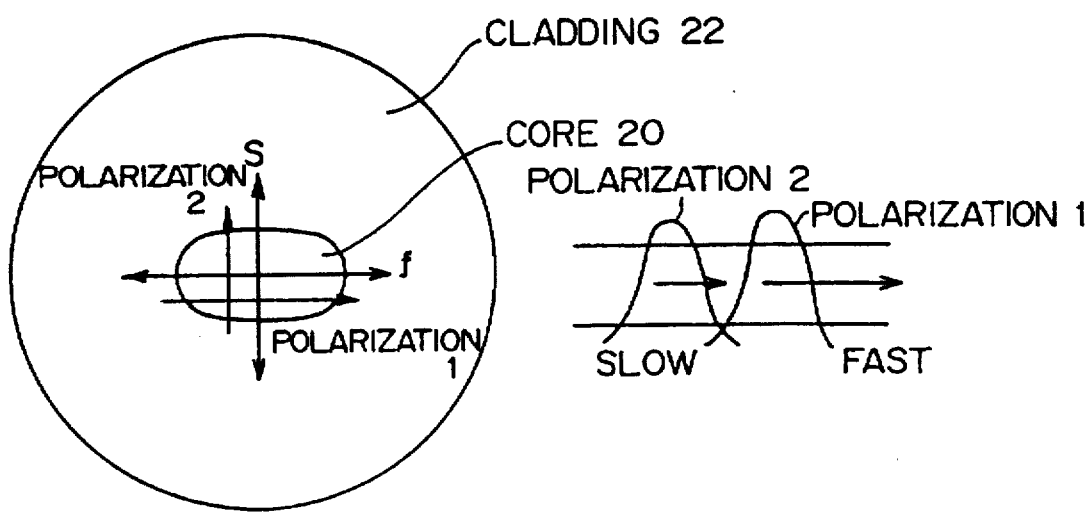
FIGS. 5A and 5B are diagrams for explaining the principle of suppression of the polarized wave dispersion by exchanging the two principal axes of birefringence.
Figure 5B:
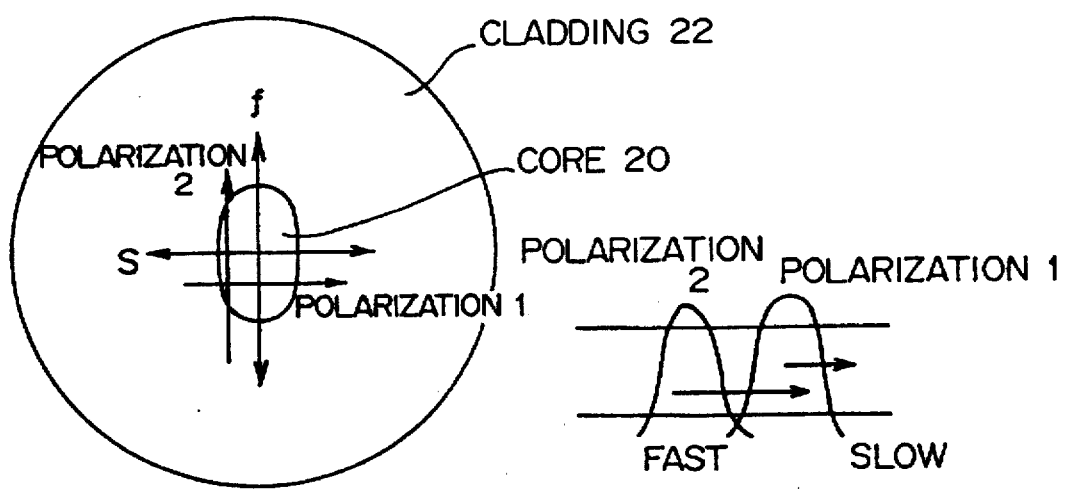

FIGS. 5A and 5B show that the polarized wave dispersion can be suppressed by exchanging the principal axes of birefringence.

FIG. 5A shows the state before the light signal passes through the twisted portion. FIG. 5B shows the state after the light signal has passed through the twisted portion.

In the state shown in FIG. 5A, a polarized light signal 1 is polarized in parallel with the fast axis f of birefringence, and a polarized light signal 2 is polarized in parallel with the slow axis s. Therefore, the polarized light signal 1 propagates in the core 20 at a higher speed while the polarized light signal 2 propagates in the core 20 at a lower speed. Accordingly, the polarized light signal 2 propagates behind the polarized light signal 1 and the dispersion between the polarized light signal 1 and polarized light signal 2 increases.

When the light has passed through the twisted portion, the fast axis and slow axis s are quickly exchanged because the twisted portion is sufficiently short. At this time, the polarization cannot keep up with the quick exchange of the principal axes, and maintains the same state as before the passage through the twisted portion. That is, the polarized light signal 1 is in the horizontal direction in FIGS. 5A and 5B, while the polarized light signal 2 is in the vertical direction in FIGS. 5A and 5B.

When the light signals pass through the twisted portion, the principal axes of birefringence of the optical fiber turn and are exchanged. That is, the slow axis s is in the horizontal direction while the fast axis f is in the vertical direction as shown in FIG. 5B. On the other hand, the polarized light signal 1 and polarized light signal 2 are the same as those shown in FIG. 5A.

Therefore, the polarized light signal 1 is parallel with the slow axis s and the polarized light signal 2 is parallel with the fast axis f. The polarized light signal 1 propagates slowly and the polarized light signal 2 propagates fast. Thus, the slow polarized light signal 2 behind the polarized light signal 1 in FIG. 5A now approaches the speed of the polarized light signal 1. As a result, the polarized light signal 2 catches or passes the polarized light signal 1.

The light signal propagating in the optical fiber twisted as described above is divided into the components parallel with the two principal axes of birefringence of the optical fiber. Each of the components propagates with one alternately catching the other. Therefore, the polarized wave dispersion is not accumulated while the light signal propagates through the optical fiber, but is appropriately offset. Thus, the dispersion is suppressed.

Figure 6:
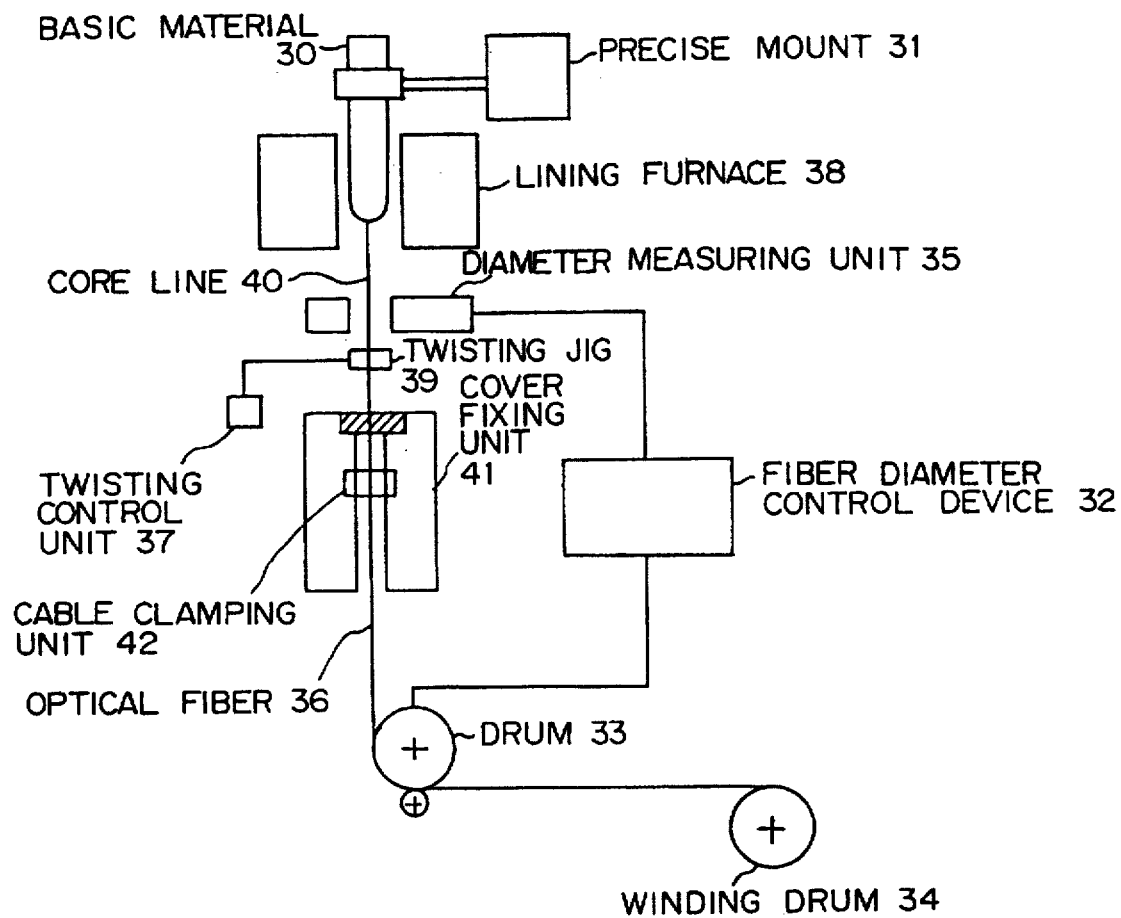
FIG. 6 shows the device and processes for manufacturing the optical fiber according to the present invention.

FIG. 6 shows the device for manufacturing the optical fiber according to the present invention.

The manufacturing device shown in FIG. 6 generates an optical fiber 36 using a fiber drawing method and comprises a basic material 30 of a core line 40 of the optical fiber 36; a precise mount 31 for precisely setting the position of the basic material 30; a lining furnace 38 for heating the basic material 30 to draw out the optical fiber 36; a cover fixing unit 41 for covering the core line 40; a drum 33 for pulling and drawing out the optical fiber 36; a winding drum 34 for winding the optical fiber 36; a fiber diameter measuring unit 35 for measuring the diameter of the core line 40; a fiber diameter control device 32 for adjusting the speed of pulling the optical fiber 36 based on the diameter measurement result for the core line 40; twisting jig 39 for fixing and twisting the core line 40; and twisting control unit 37 for controlling the twisting of the twisting jig 39.

The basic material 30 is used for the core line 40 and formed by an internal core and the covering cladding. The basic material 30 is heated by the lining furnace 38. When the basic material 30 becomes soft, it is drawn out into the thin core line 40.

The drawn core line 40 is supported by the twisting jig 39, and is twisted at predetermined intervals under the control of the twisting control unit 37 in such a way that the core line 40 is 90° twisted between the pre-twisted portion and post-twisted portion. The predetermined interval is adjusted in a way that it is shorter than the above described sustaining distance of birefringence in consideration of the relationship between the interval and the drawing out speed for the optical fiber 36.

When the core line 40 is twisted between the twisting jig 39 and a cable clamping unit 42 of the cover fixing unit 41, there also is a twist between the basic material 30 and core line 40. Therefore, the basic material 30 can be designed to be twisted in synchronism with the core line 40. However, since there is a relatively large clearance between the basic material 30 and-twisting jig 39, the core line 40 receives, on average, only a small twisting force along this distance, and will have no influence on the twisting action between the twisting jig 39 and the cable clamping unit 42 of the cover fixing unit 41.

A cover material is put over the core line 40 by the cover fixing unit 41. The cover material is normally nylon, a UV cured resin, etc. The UV cured resin is obtained by curing the material by applying ultraviolet rays to the material after it has been attached to the core line. Thus, the optical fiber 36 comprising the corer cladding, and cover is drawn out and transferred by the drum 33. The transferred optical fiber 36 is wound on the winding drum 34 as a completed product.

The device shown in FIG. 6 is provided with the fiber diameter control device 32. The fiber diameter control device 32 is connected to the diameter measuring unit 35, which measures the diameter of the core line 40, and outputs the result to the fiber diameter control device 32. The diameter measuring unit 35 is, for example, the laser micrometer, etc. but does not have to be any specific device as long as it can measure the diameter of the core ling 40.

The fiber diameter control device 32 reads a change in the diameter of the core line 40 from the measurement value of the diameter measuring unit 35, and controls the speed of rotation of the drum 33 so that the diameter of the core line 40 is constant. For example, when the speed of rotation becomes high, the tension on the optical fiber 36 becomes higher and the diameter of the core line 40 drawn out from the basic material 30 becomes smaller. If the speed of rotation of the drum 33 becomes lower, then the tension on the optical fiber 36 becomes lower and the diameter of the core line 40 drawn out from the basic material 30 becomes larger.

Under the control of the fiber diameter control device 32, an optical fiber 36 of uniform diameter can be produced. Nevertheless, a slight unevenness remains. Since this may cause the above described polarized wave dispersion, the twisting control unit 37 and twisting jig 39 are provided according to the present invention to twist the core line 40 at predetermined intervals.

Figure 7A:
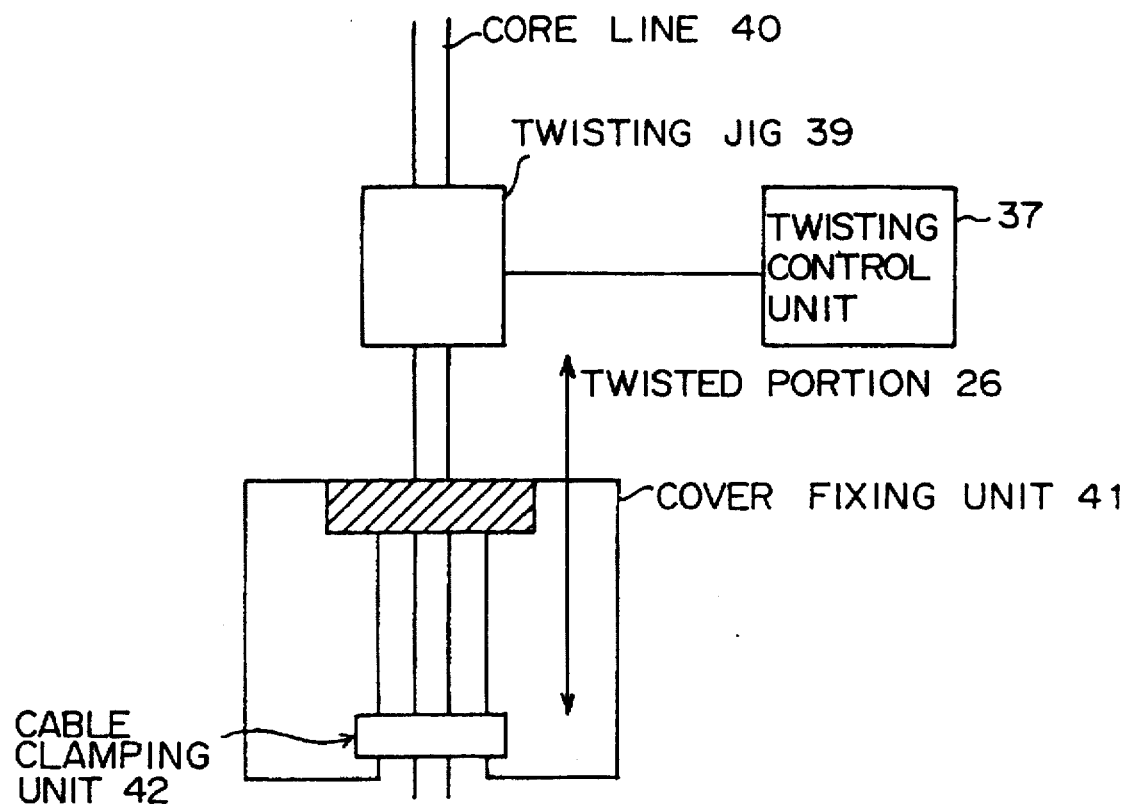
FIGS. 7A and 7B show the configuration for twisting the core line of optical fibers, and an example of a twisting jig.
Figure 7B:
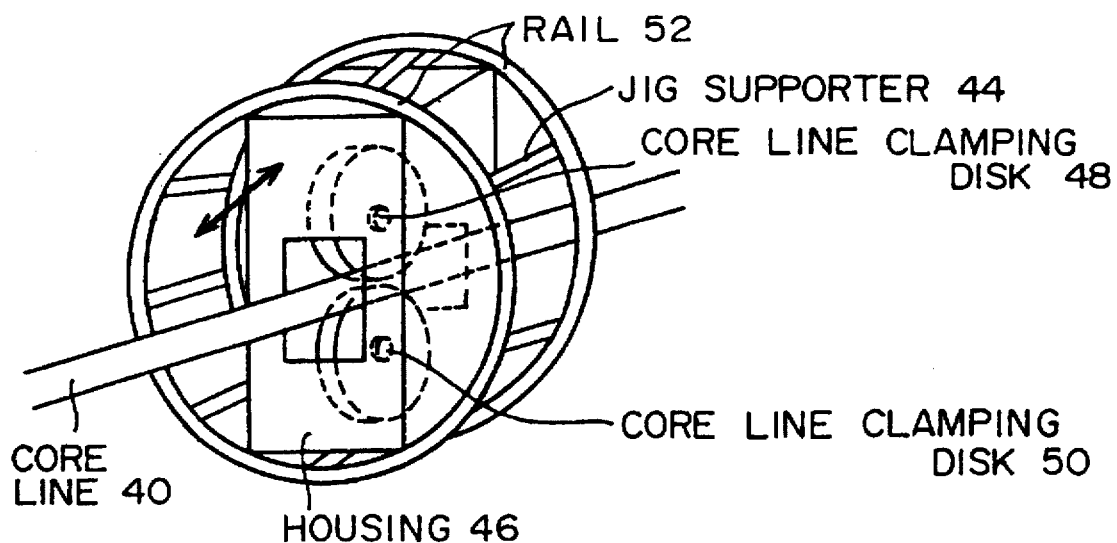

FIGS. 7A and 7B show a configuration for twisting the core line 40.

As shown in FIG. 7A, the core line 40 from the basic material 30 is clamped by the twisting jig 39 and twisted by a predetermined angle clockwise and counterclockwise at predetermined intervals. The twisting control unit 37 controls the timing and angle of rotation of the twisting jig 39.

The core line 40 is clamped by the core clamping unit (not shown in the drawings) in the twisting jig 39 so that the core line 40 can be twisted between the core clamping unit of the twisting jig 39 and the cable clamping unit 42 behind the cover fixing unit 41. The core line 40 is covered just before the cable clamping unit 42, and fixes the core line 40 as it has been twisted.

The twisted portion 26 shown in FIG. 4 corresponds to the portion between the core clamping unit of the twisting jig 39 and the cable clamping unit 42. Therefore, the distance between the core clamping unit of the twisting jig 39 and the cable clamping unit 42 is 1 m at maximum, and in practice should be several millimeters through several tens of centimeters.

A thermoplastic type cover, for example, nylon, is normally heated to 150°–300° C. to be in a liquid state. The liquid cover is applied to the core line 40, and then rapidly cooled down to room temperature for fixing to the core line 40. The distance between the core clamping unit of the twisting jig 39 and the cable clamping unit 42 should be short and 1 m at maximum, since this distance determines the length of the twisted portion. However, since the core line 40 is very thin, the cover is also thin and the liquid cover rapidly sets and holds the twisting of the core line 40. Therefore, the optical fiber does not pass through the cable clamping unit 42 before the cover sets. Therefore, the distance between the core clamping unit of the twisting jig 39 and the cable clamping unit 42 can be short, thereby the length of the twisting portion can be made shorter.

FIG. 7B shows an example of the configuration of a twisting jig. The configuration of the twisting jig 39 is not limited to the configuration shown in FIG. 7B, but can be any configuration as long as it allows the core line 40 to be clamped and twisted.

The twisting jig shown in FIG. 7B clamps the core line 40 by holding it between rotatable core line clamping disks 48 and 50. The core line clamping disks 48 and 50 clamp the core line 40, and allow it to be pulled in the direction of cover fixing unit 41 by the rotation of both disks.

The core line clamping disks 48 and 50 are accommodated in the housing 46, and the core line 40 passes through a hole in the housing 46. The housing 46 is mounted in a jig supporter 44 to allow for rotation, and is rotated around rails 52 provided the core line 40 by a drive unit (not shown in the drawings) controlled according to the signal from the twisting control unit 37. Therefore, the core line clamping disks 48 and 50 clamping the core line 40 rotate with the housing 46.

Since the core line clamping disks 48 and 50 firmly clamp the core line 40, the core line 40 is twisted as the core line clamping disks 48 and 50 are radially rotated in the twisting jig 39.

The rotation is made clockwise and counterclockwise by a given angle of rotation so that the final twisting is equal to or larger than 90°. The angle of rotation should be a little larger than 90° to accommodate the untwisting action occurring after twisting of the core line 40 by the twisting jig and before the cover can be completely fixed.

Figure 8A:
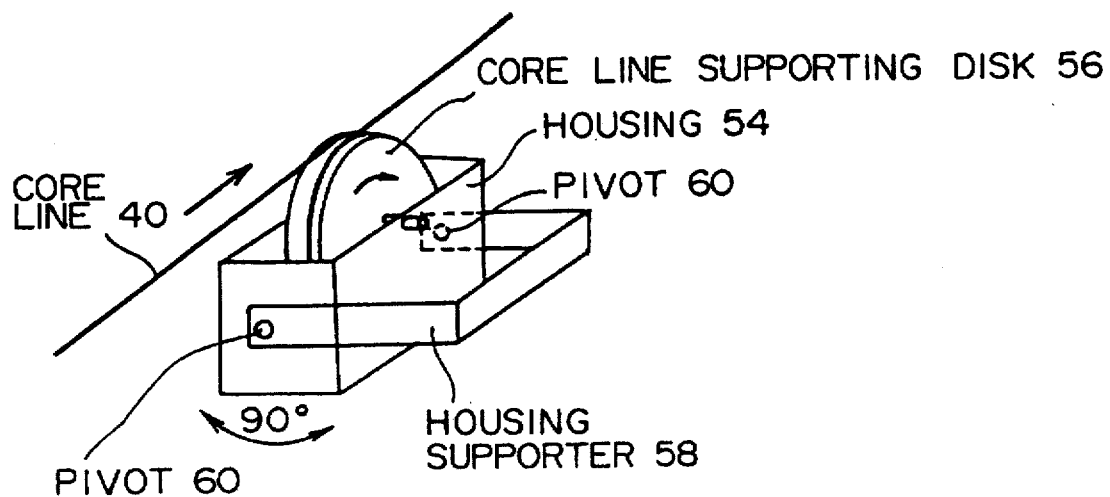
FIGS. 8A and 8B show another example of the configuration of the twisting jig.
Figure 8B:
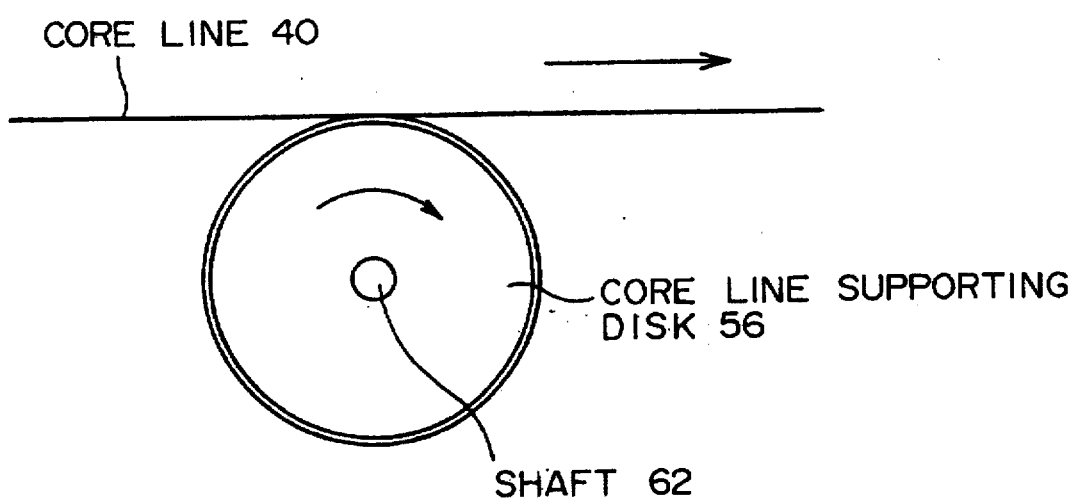

FIGS. 8A and 8B show another possible configuration of twisting jig 39.

As shown in FIG. 8A, the twisting jig according to the present configuration comprises a core line supporting disk 56 for supporting the core line 40; a housing 54 for accommodating the core line supporting disk 56; a housing supporter 58 for supporting the housing 54; and pivots 60 for rotating the housing 54 within the housing supporter 58.

The twisting jig according to the present configuration supports the core line 40 by winding the core line 40 around the core line supporting disk 56. As shown in FIG. 8B, when the core line 40 is pulled in the direction of the arrow in the fiber drawing process, the core line 40 rotates the core line supporting disk 56 on a shaft 62.

As shown in FIG. 8A, the housing 54 is connected to the housing supporter 58 by the pivots 60 so that the housing 54 can rotate on the pivots 60. Housing 54 is rotated according to a predetermined angle of rotation, timing, and twisting direction by a drive unit (not shown in the drawings) controlled according to the signal output by the twisting control unit 37 shown in FIG. 7A.

The above described embodiment shows only the configuration in which the core line of the optical fiber is twisted 90° clockwise and counterclockwise alternately. This is a preferred embodiment, but the present invention is not limited to this application. That is, the twisting is not necessarily made for 90° rotation, but can be made for optional angles of rotation. Furthermore, the core line can be twisted clockwise and counterclockwise alternately, but can also be twisted in one direction only.

In addition to the twisting of only a core line, the present invention also includes the twisting of the core line together with its cover wherein the twisting action is maintained by an external force. These applications can similarly feature the polarized wave dispersion suppressing effect.

Since the sustaining distance of the polarized wave can be effectively shortened by twisting the core line of optical fibers at predetermined intervals, the polarized wave dispersion generated by the propagation of an optical signal through the entire optical fiber over a long distance can be suppressed.

Twisting the core line by approximately 90° allows the two principal axes of birefringence of the optical fiber to replace each other between the antecedent and consequent portions of the twisted portion. Making the twisted portion short enough can quickly exchange the two principal axes of birefringence arising when the optical signal is transmitted. Therefore, no change occurs in the polarization of the light signal, and the optical fibers at the antecedent and consequent portions offset the polarized wave dispersion. Thus, the polarized wave dispersion of the entire optical fiber can be further suppressed.

Since the optical fiber with a twisted core line can be easily manufactured, the manufacturing costs can be saved and the optical fiber can have better transmission characteristics for long-distance communications with the polarized wave dispersion suppressed.

What is claimed is:

1. An optical fiber having a residual birefringence causing polarized wave dispersion by randomly affecting propagating light, comprising:

a core line for propagating light; and a cover formed over said core line, said optical fiber being twisted at least on said core line in a predetermined range at given intervals and thereby reducing said polarized wave dispersion.

2. The optical fiber according to claim 1, wherein said optical fiber is twisted only on said core line; and said core line is fixed as being twisted by said cover over said core line.

3. The optical fiber according to claim 2, wherein said cover is stronger at twisted portions of said core line to maintain a rotation force in the twisted portions and to prevent said optical fiber from being sharply bent.

4. The optical fiber according to claim 3, wherein said cover is thickened to be stronger at the twisted portions.

5. The optical fiber according to claim 3, wherein a material of said cover is cured to be stronger at the twisted portions.

6. The optical fiber according to claim 3, wherein a material of said cover is changed into another material to be stronger at the twisted portions.

7. The optical fiber according to claim 1, wherein said core line is 90° twisted.

8. The optical fiber according to claim 1, wherein said core line is twisted clockwise and counterclockwise alternately.

9. The optical fiber according to claim 1, wherein said predetermined range in which said optical fiber is twisted is shorter than a beat length of the light dependent on residual birefringence of said optical fiber, and is long enough not to damage said optical fiber.

10. The optical fiber according to claim 1, wherein said given intervals are shorter than a length in which characteristics of the residual birefringence of said optical fiber remain unchanged.

11. A method of manufacturing an optical fiber formed by a core line for propagating light and a cover applied over the core line, comprising the steps of:

heating a basic material having a core and a cladding;

forming the core line by drawing out said heated basic material;

twisting the core line in a predetermined range at given intervals thereby reducing polarized wave dispersion caused by residual birefringence of said optical fiber that randomly affected said propagating light.

12. The method according to claim 11, wherein said cover is stronger at twisted portions of said core line to maintain a rotation force at the twisted portions and to prevent said optical fiber from being sharply bent.

13. The method according to claim 12, wherein said cover is thickened to be stronger at the twisted portions.

14. The method according to claim 12, wherein a material of said cover is cured to be stronger at the twisted portions.

15. The method according to claim 12, wherein a material of said cover is changed into another material to be stronger at the twisted portions.

16. The method according to claim 11, wherein only a supporting device of the core line is rotated without rotating a cover forming device when the core line is provided with the cover.

17. The method according to claim 11, wherein said core line is 90° twisted.

18. The method according to claim 11, wherein said core line is twisted alternately clockwise and counterclockwise.

19. The method according to claim 11, wherein said predetermined range in which said optical fiber is twisted is shorter than a beat length of the light dependent on residual birefringence of said optical fiber, and is long enough not to damage said optical fiber.

20. The method according to claim 11, wherein said given intervals are shorter than a time length in which characteristics of the residual birefringence of said optical fiber remain unchanged.

* * * * *